United States Patent
Miyazaki

[11] Patent Number: 6,104,508
[45] Date of Patent: Aug. 15, 2000

[54] SCANNER

[75] Inventor: Hitoshi Miyazaki, Chigasaki, Japan

[73] Assignee: Matsushita Graphic Communication Systems, Inc., Tokyo, Japan

[21] Appl. No.: 09/176,933

[22] Filed: Oct. 23, 1998

[30] Foreign Application Priority Data

Nov. 6, 1997 [JP] Japan ................................. 9-320361

[51] Int. Cl.[7] .................................................. H04N 1/04
[52] U.S. Cl. .......................... 358/474; 358/404; 358/468
[58] Field of Search .................................. 358/400, 468, 358/474, 473, 478, 479, 404; 382/312, 313

[56] References Cited

U.S. PATENT DOCUMENTS

| | | | |
|---|---|---|---|
| 5,166,812 | 11/1992 | Dow | 358/498 |
| 5,172,243 | 12/1992 | Hayashi | 358/400 |
| 5,402,251 | 3/1995 | Ogasawara | 358/473 |
| 5,673,117 | 9/1997 | Ezumi | 358/400 |
| 5,825,505 | 10/1998 | Toyoda | 358/400 |
| 5,854,694 | 12/1998 | Payne | 358/473 |

*Primary Examiner*—Jerome Grant, II
*Attorney, Agent, or Firm*—Greenblum & Bernstein, P.L.C.

[57] ABSTRACT

It is decided whether or not image data are in memory section 21. In the case where image data that had been stored has been already erased, when erasing button 5 is pushed, the image data of scanner 1 is changed. Thus, it is possible to erase the image data and change the image mode of scanner 1 with one button, i.e. erasing button 7.

20 Claims, 6 Drawing Sheets

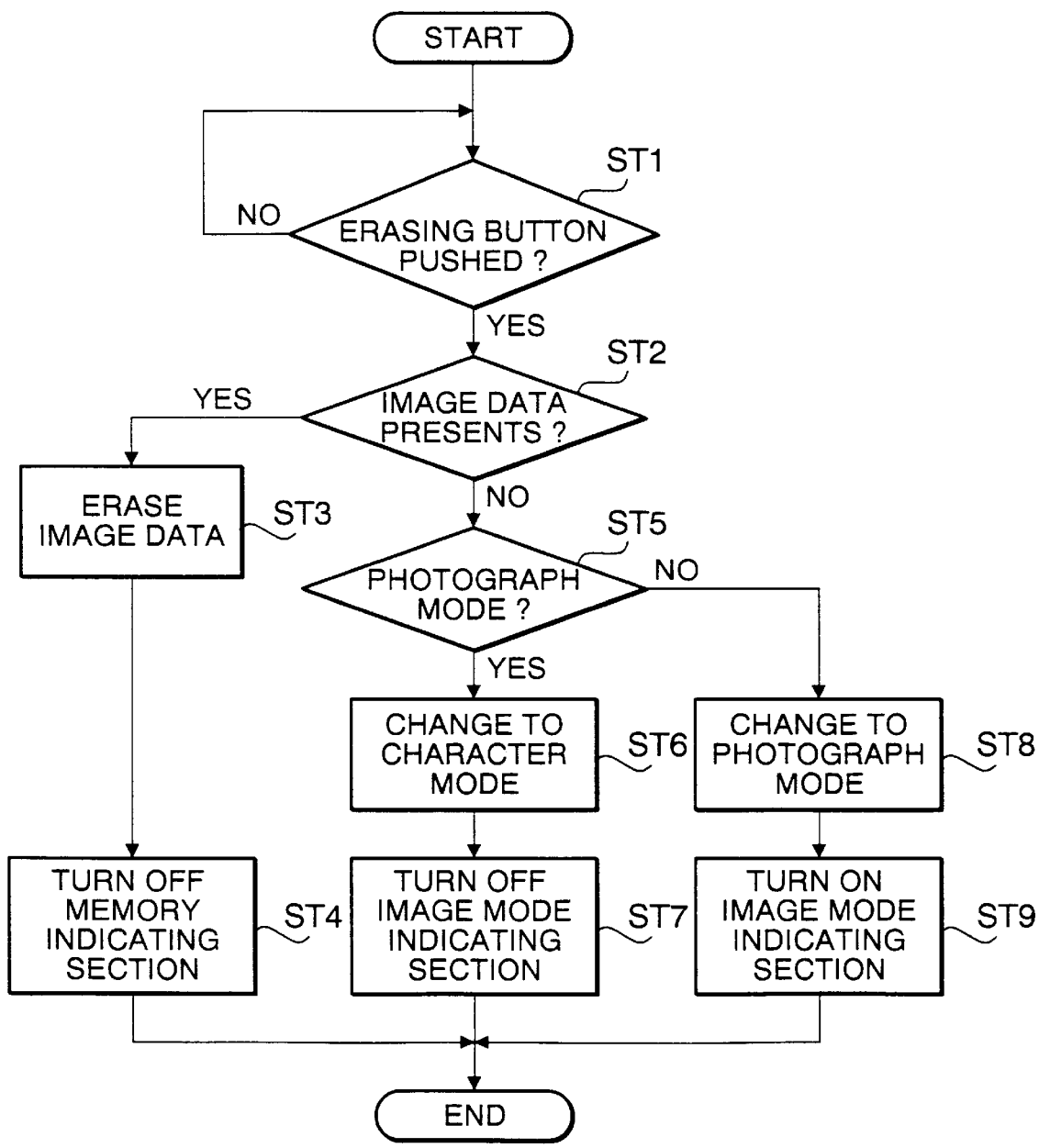

SCANNER

BACKGROUND OF THE INVENTION

1. Field of the Invention

The present invention relates to a scanner that can be removed and attached from/to a facsimile apparatus.

2. Description of the Related Art

A scanner that can be removed and attached from/to a facsimile apparatus has been spread since previously. Recently a scanner with a battery as a power supply and a memory to store image data, thereby being removal from a facsimile apparatus and used as a portable handy scanner, is available.

Since such scanner is used as a scanner when it is installed in a facsimile apparatus, the changing of the image mode of the scanner is performed by the facsimile apparatus side.

Therefore, in the conventional technology, since the changing of the image mode can not be performed in the scanner side even when the scanner is removed from the facsimile apparatus used as a portable handy scanner, the changing of the image mode should be performed in the facsimile apparatus side after the scanner has been installed in the facsimile apparatus, which has remained the problem of poor maneuverability.

In addition, since a conventional scanner does not have a section to indicate that image data is stored in a memory, there has been a problem that an operator can not recognize whether or not image data is stored in a memory, therefore erases the necessary image data by accident.

Further there has been another problem in the conventional scanner that the scanner does not have a section to indicate the image mode, and scans image data in an improper image mode.

Meanwhile, preparing many operation buttons in the scanner causes another problem such as complicated operations and a increases of cost.

SUMMARY OF THE INVENTION

An object of the present invention is to provide a scanner capable of changing an image mode in the scanner side, preventing image data stored in a memory section to be erased by accident, and scanning image data in a proper image mode.

Another object of the present invention is to provide a scanner having less operation buttons, simplified operations, and low cost.

The present invention has the constitution where a removal scanner in a facsimile apparatus comprises a scanning section for scanning image data of an original, a memory section for storing the scanned image data, an interface section for transferring the scanned image data to the facsimile apparatus, and an erasing button for erasing the image data stored in the memory section.

According to the constitution, it is possible to change an image mode of a scanning device in the scanning device side without installing the scanning device in the facsimile apparatus.

BRIEF DESCRIPTION OF THE DRAWINGS

FIG. 6 is a flow chart of the operation when changing an image mode of scanner 1 in one embodiment of the present invention.

DESCRIPTION OF THE PREFERRED EMBODIMENT

Hereinafter a scanner in the embodiment of the present invention is explained with reference to drawings.

Figure 1:
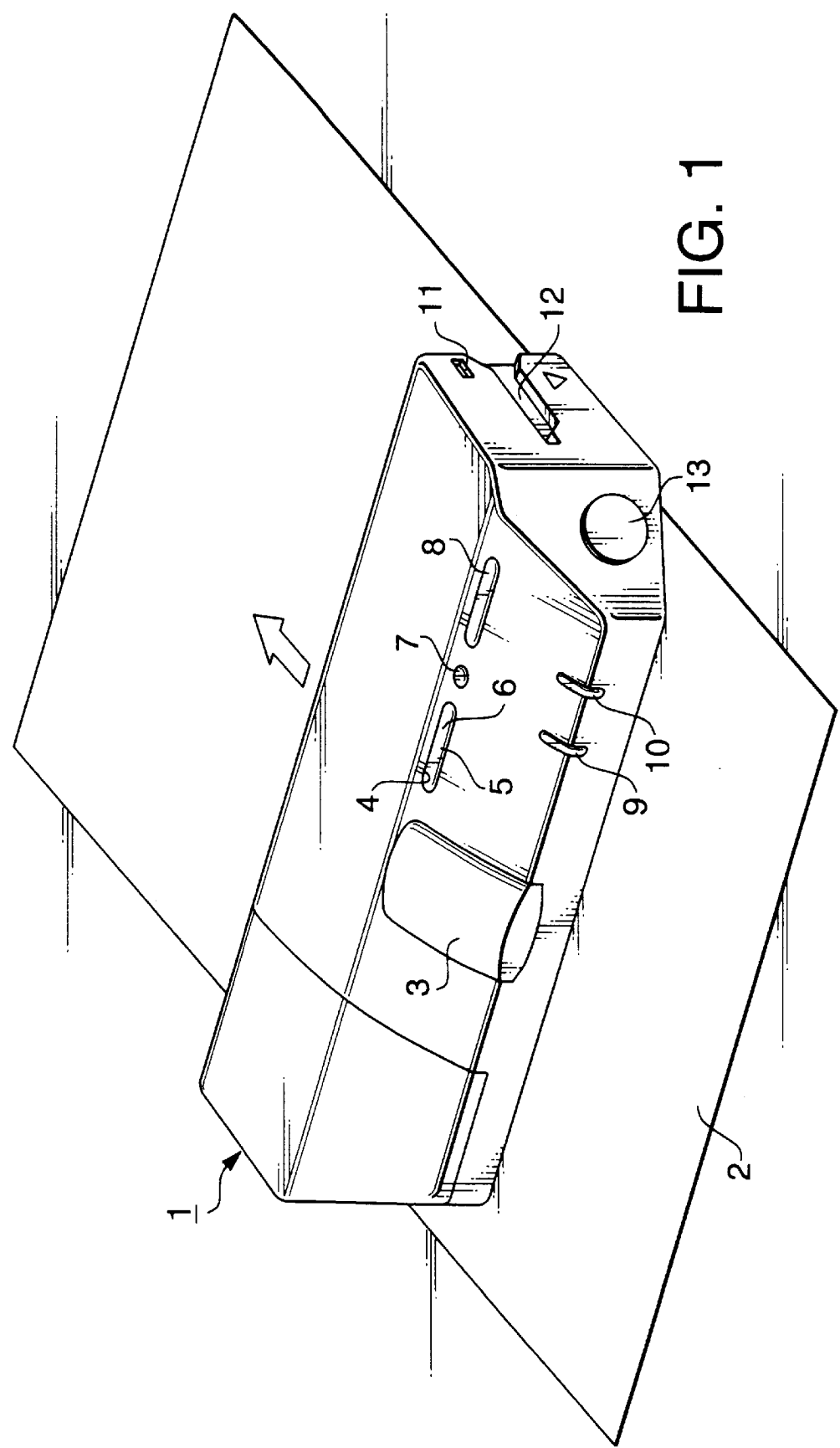
FIG. 1 is a schematic perspective view of a scanner in one embodiment of the present invention.

FIG. 1 is a perspective view of a scanner in one embodiment of the present invention. In FIG. 1, scanner 1 is removed from a facsimile apparatus (not shown) and is placed on original 2 with a scanning face directed to original 2.

Scanner 1 is slender and long in the horizontal scanning direction, and has enough length to scan a longer length of the original of B4 size (36.4×25.7 cm).

Scanning button 3 is provided in an operation face of scanner 1, and an operator performs the scanning (vertical direction) of original 2, scanning to the direction indicated by an arrow in the figure by hand with scanning button 3 pushed.

In addition, groove 4 is formed near scanning button 3, and erasing button 5 and memory display 6 are provided at the bottom. If erasing button 5 sticks out from the box surface of scanner 1, erasing button 5 may be pushed by accident. Therefor erasing button 5 is provided at the bottom so that erasing button 5 does not stick out from the box surface.

In addition, image mode indicating section 7 and size switching button 8 for designating a size of scanned image are provided near groove 4.

In addition, charge amount indicating section 9 for indicating a battery charge state and scanning operation indicating section 10 for indicating a scanning state of image data are provided at a seeable part on the operation face.

Charge amount indicating section 9 flashes red in the case of inadequate charge amount, and flashes green in the case of adequate charge amount to operate. And scanning operation indicating section 10 flashes repeatedly while scanning the original.

Engaging hole 11 and engaging groove 12 to engage scanner 1 to the facsimile apparatus are provided on both sides on scanner 1 in the horizontal direction. When scanner 1 is installed in the facsimile apparatus, scanner 1 is fastened to the facsimile apparatus with engaging hole 11 and engaging groove 12 engaged with engaging sections (not shown) in the facsimile apparatus.

In addition, concavity section 13 is provided on both sides of scanner 1 in the horizontal direction for an operator to touch.

Next the functions of scanner 1 are explained with reference to FIG. 2.

Figure 2:
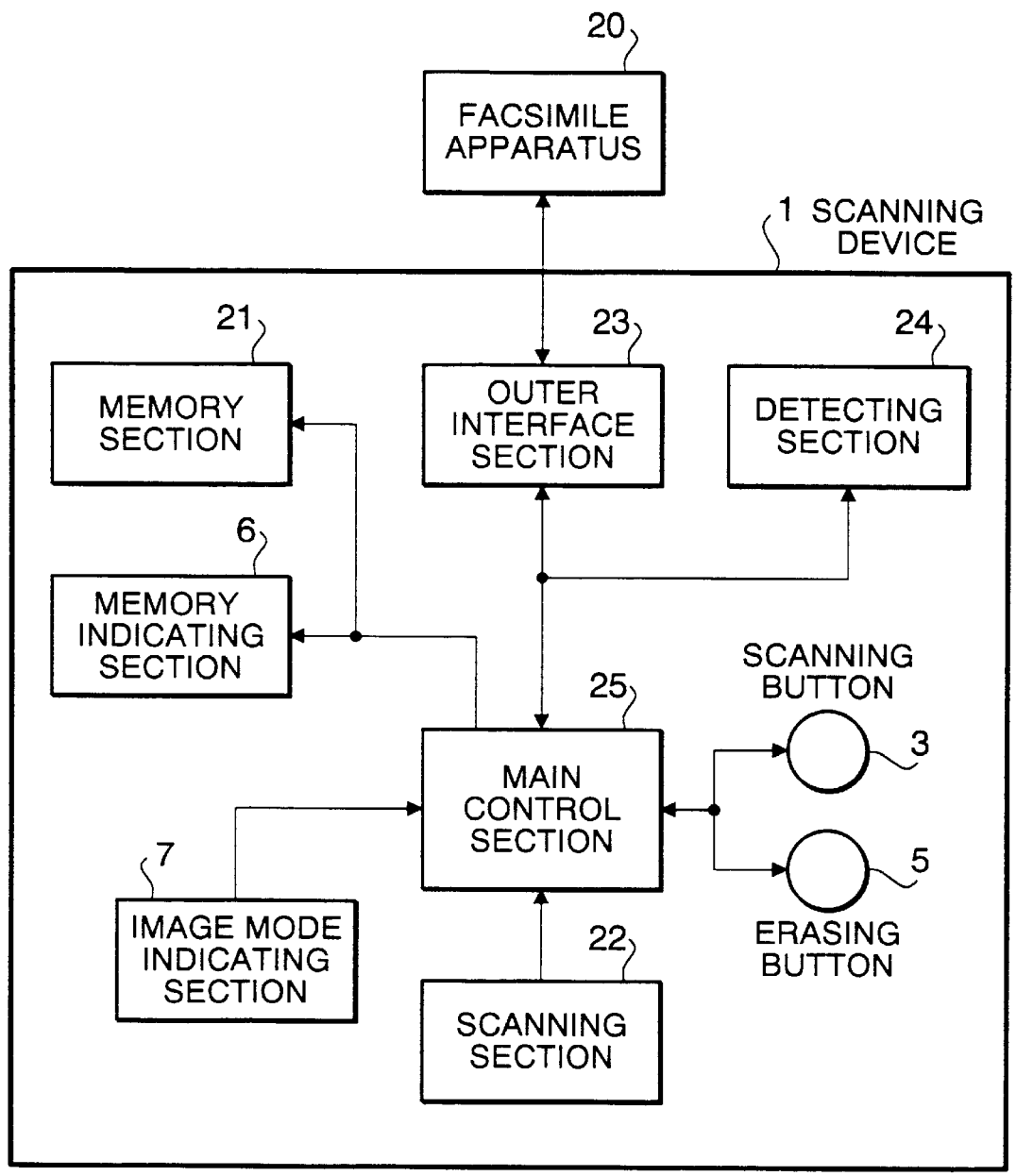
FIG. 2 is a schematic diagram showing the function of the scanner of one embodiment of the present invention.

FIG. 2 is a schematic diagram showing the functions of the scanner in one embodiment of the present invention. The same parts as those in FIG. 1 are assigned the same numbers.

Memory section 21 is a memory to temporarily store image data scanned from original 2. In this embodiment, memory section 21 has a capacity to store image data of a sheet of a B4 size original in the photograph mode, and to store image data of ten sheets of B4 size originals in the character mode of black and white binary. Scanning section 22 is composed of close fit image sensors and so on, and functions to scan the original.

Memory indicating section 6 is a memory to indicate whether or not image data are in memory section 21. Memory indicating section 6 flashes in the case where image data are in memory section 21, and flashes repeatedly when scanned image data excesses the capacity of memory section 21.

Image mode indicating section 7 flashes in the case where the image mode is the photograph mode, and does not flash in the case where the image mode is the character mode.

Outer interface section 23 performs the exchange of a control signal and image data with facsimile apparatus 2. For instance, outer interface section 23 transmits data stored in memory section 21 to a recording section (not shown) in the facsimile apparatus 20 and an outer communication link.

Detecting section 24 detects whether or not scanner 1 is connected with facsimile apparatus 20. When scanner 1 is installed in facsimile apparatus 20, scanner 1 can be connected with facsimile apparatus 20 electrically to perform the exchange of a signal with facsimile apparatus 20. In addition, in the case where scanner 1 does not perform the exchange of a signal with facsimile apparatus, a battery (not shown) is charged. And in the case where detecting section 24 detects that scanner 1 is installed in facsimile apparatus 20, scanner 1 is designed not to operate by pushing any button to prevent an error operation.

Main control section 25 provides the entire control over the apparatus.

Figure 3:
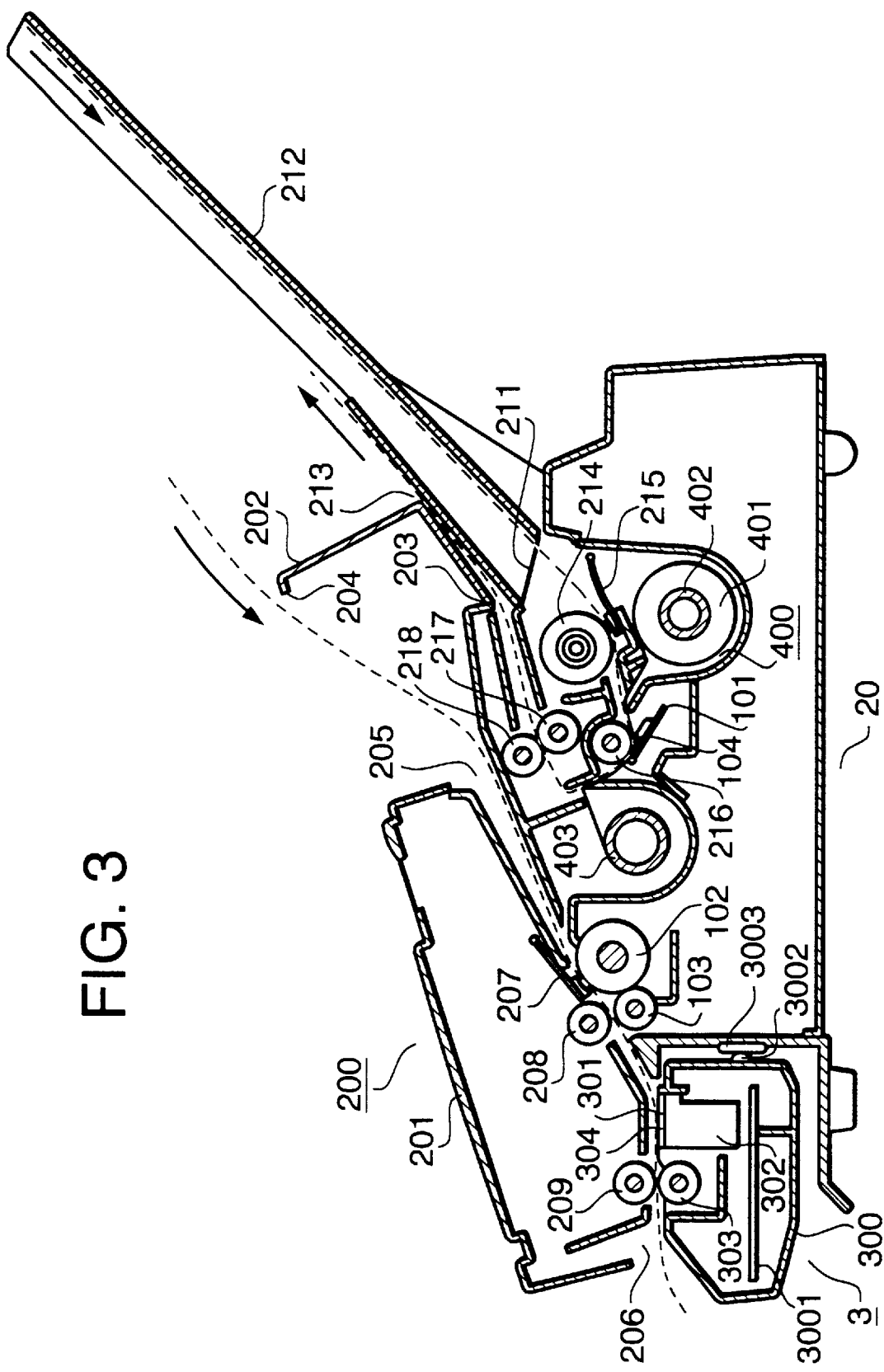
FIG. 3 is a schematic sectional view showing the state when the scanner in one embodiment of the present invention is installed in a facsimile apparatus.

Next an explanation is given to the state in which a scanner in one embodiment of the present invention is installed in the facsimile apparatus with reference to FIG. 3.

FIG. 3 is a schematic sectional view showing the state when the scanner in one embodiment of the present invention is installed in the facsimile apparatus. In the following explanation, the direction to which recording paper goes is assumed to be a front surface and the converse direction is assumed to be a back surface.

As illustrated in FIG. 3, the facsimile apparatus with the scanner in this embodiment installed is composed of facsimile apparatus main body 2000, operation panel section 200 and scanning section 1000. Operation panel section 200 is fixed to a rotation shaft (not shown) at the upper part of facsimile apparatus main body 2000 so that operation panel can pivot around the shaft.

Ink film unit 400 to use in performing an image transfer on recording paper is set in facsimile apparatus main body 2000. Ink film unit 400 comprises ink film 401 capable of being transferred on recording paper by heat, feed reel 402 around which all ink films are wounded before using, take-up reel to wind up the ink film corresponding to the record transfer operation. Ink film unit 400 is provided in facsimile apparatus main body 2000 so that feed reel 402 is placed behind take-up reel 403. When data are recorded, take-up reel 403 rotates counterclockwise in FIG. 3 according to the timing of the record transfer operation to wind up ink film 401 sequentially.

Facsimile apparatus main body 2000 has a frame structure, and the front top surface of facsimile apparatus main body 2000 is used as a guide for a carried original at the time of the original scanning operation. In addition, facsimile apparatus main body 2000 has recording head 101, auto document feed (hereinafter abbreviated as ADF), roller 102, original feed roller 103, power unit (not shown), control board (not shown) and so on. Recording head 101 is placed between feed reel 402 and take-up reel 403 in ink film unit 4. Recording head 101 is heated at the time of the record transfer operation, which makes the sublimation of the ink of ink film 401, and the ink is transferred on the recording paper carried at recording point 104.

ADF roller 102 is placed at front top in facsimile apparatus main body 2000, and rotates counterclockwise in FIG. 3 at the time of the original scanning operation. And original feed roller 103 is located toward the record paper carrying direction of ADF roller, and rotates counterclockwise in FIG. 3. Both rollers function to carry the original to scanning section 1000.

Operation panel section 200 has a frame structure. The back surface of operation panel section 200 functions as a guide of the original carried at the time of the original scanning operation and a guide of recording paper carried at the time of recording paper transfer operation. Various operation buttons 201 are arranged on the upper surface of operation panel section 200. An operator pushes down operation buttons 201 to perform various operations in the facsimile apparatus.

Original tray 202 on which the original is set is provided on an upper back surface of operation panel section 200. Original tray is fixed to operation panel 200 to be pivotable around hinge 203. Original tray 202 is opened to set the original, and the original is received at end part 204 of original tray 202. On the other hand, when the original is not transmitted, closed original tray 202 brings the dustproof effect to original insert opening 205.

In addition, a space between operation panel section 200 and scanning section 1000 functions as original discharging opening 206.

In addition, at the front of operation panel section 200, original separating pad 207, pinch roller for original 208, and original discharging opening 208 are provided. Original separating pad 207 is placed toward ADF roller 102 with a pad touched with ADF roller 102 so that a sheet of paper is separated from a plurality of sheets set. Pinch roller for original 208 is placed toward original feed roller 103, and helps the original go to scanning section 1000 smoothly.

Original discharging roller 209 is placed toward encoder roller 303, rotates clockwise in FIG. 3 to discharge a scanned original from original discharging opening 206.

Recording paper inserting opening 211 is provided at the back part of operation panel section 200. Recording paper tray 211 in which recording paper is stored is inserted into recording paper insert opening 211 to be set, thereby recording paper is set. In addition, recording paper discharging opening 213 is provided at the upper part to discharge transferred recording paper.

In the bottom of operation panel section 200, auto sheet feed (hereinafter abbreviated as ASF) roller 214, recording paper separating pad 215, recording roller 216, recording paper discharging roller 217 and pinch roller for recording paper 218 are primarily provided.

ASF roller 214 is provided above feed reel 402 in ink film unit 400. ASF roller rotates clockwise in FIG. 3 at the time of the recording paper transfer operation to carry recording paper to recording position 104. Recording paper passes under ASF roller 214.

Recording paper separating pad 215 is placed toward to ASF roller with a pad touched with ASF roller 214 so that a sheet of paper is separated from a plurality of sheets set.

Recording roller 216 is placed toward recording head 101. Recording roller 216 works to insert ink film between recording head 101. Recording roller 216 at the time of the recording paper transfer operation rotates clockwise in FIG. 3 to insert recording paper between ink film 401, thereby giving a tension to recording paper and ink film 401 to assist the smooth transfer at recording position 104.

Recording paper discharge roller 217 rotates clockwise in FIG. 3 to discharge transferred recording paper from recording paper discharging opening 213. In addition, pinch roller for recording 218 is placed toward recording paper discharging roller 217 to assist the smooth carry of transferred recording paper to recording paper discharging opening 213.

Next scanning section 1000 is explained with reference to FIG. 4.

Figure 4:
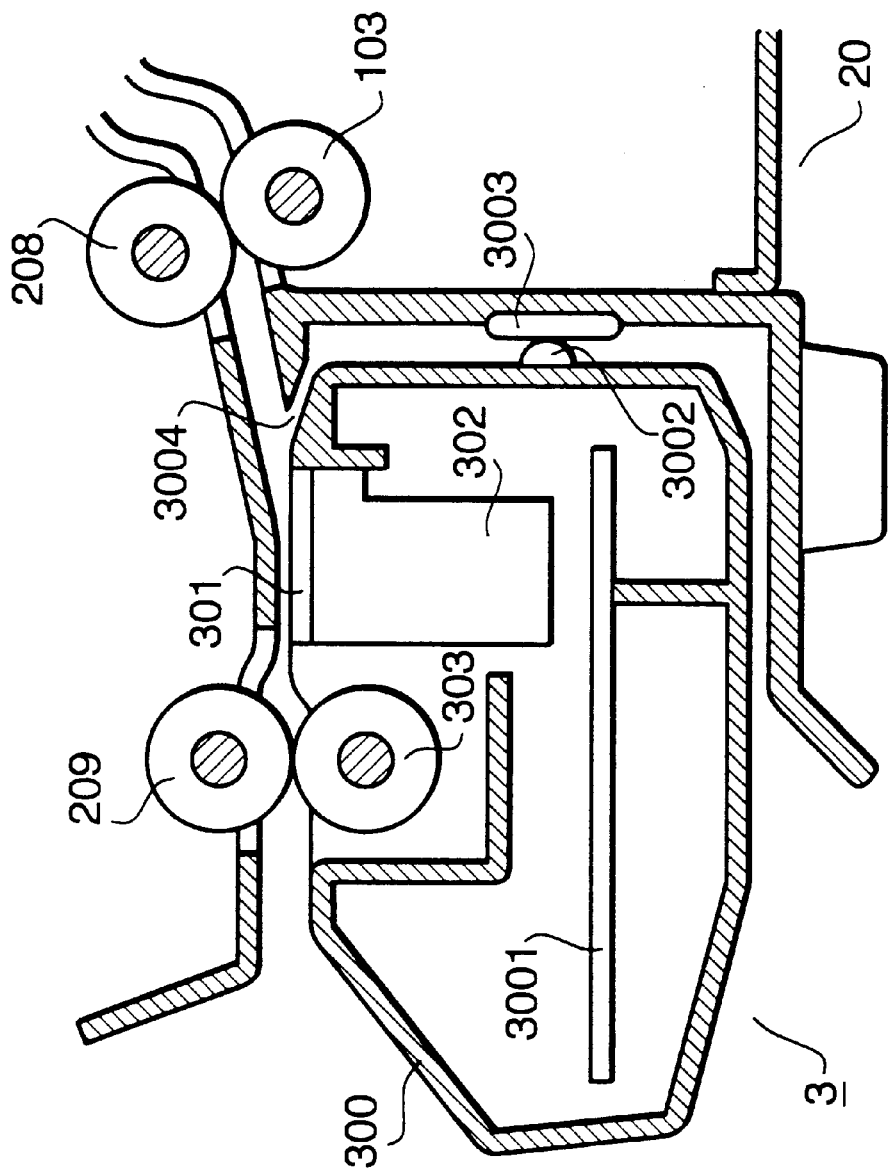
FIG. 4 is an enlarged sectional view of a scanning section 1000 when the scanner in one embodiment of the present invention is installed in a facsimile apparatus.

FIG. 4 illustrates an enlarged sectional view of scanning section 1000 when a scanner in the embodiment of the present invention is installed in a facsimile apparatus. In FIG. 4, scanner 1 is stored with a scanning surface up by support section 3001. The scanning surface of scanner 1 is composed of protection glass 301 and scanning unit 302. Scanning unit 302 is configured so that the image formation of an original image is made in an image sensor (not shown) through an optical lens system by lightening the original with a LED light source (not shown).

Encoder roller 303 is provided at the head point of scanner 1 in the direction carrying an original. Encoder roller 303 includes a slit hole (not shown), the optical system and a control section.

In addition, power lug 3002 is provided on the back of scanner 1 to receive a power supply from facsimile apparatus 1. Meanwhile, power supply plate 3003 to which power lug 3002 is touched is provided in facsimile apparatus main body 2000. Further, an infrared port (not shown) is provided on the back surface of scanner 1. Another infrared port is provided on a surface of facsimile apparatus that is faced toward the back surface of scanner 1. Both infrared ports are to receive and transmit data.

In addition, in the front of a scanning surface of scanner 1 in the direction carrying original, taper 3004 is provided to carry a carried original to the scanning surface smoothly. Slit 3004 works to carry original without causing paper stuck in spite of imperfect flatness of original caused by wound or folded.

Next the operation of attaching and removing the scanner in the embodiment of the present invention to/from facsimile apparatus 20 is explained with reference to FIG. 5.

Figure 5:
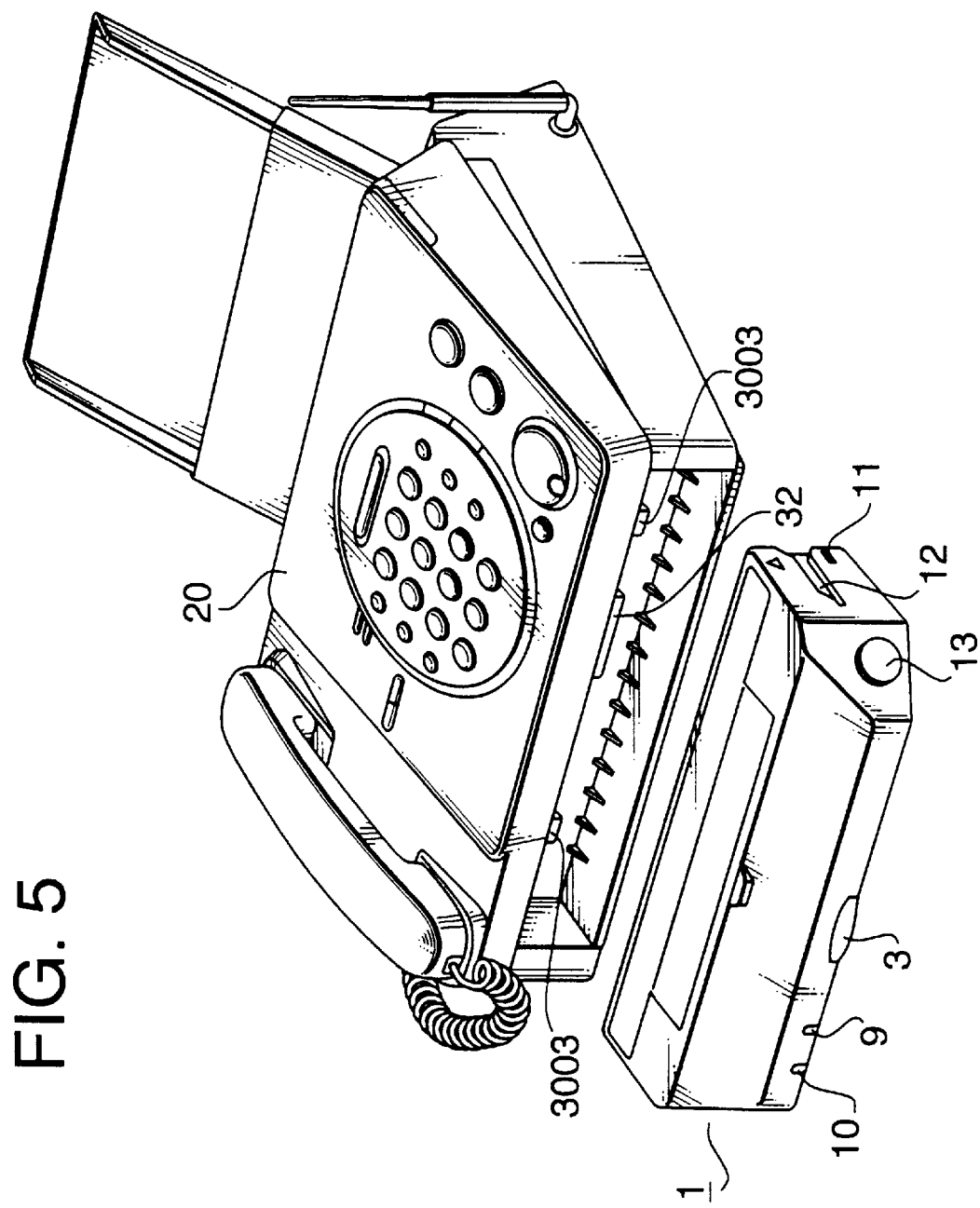
FIG. 5 is an entire perspective showing the state when scanner 1 in one embodiment of the present invention is removed and attached from/to facsimile apparatus 20.

FIG. 5 is an entire perspective view showing how to attach and remove scanner in the embodiment of the present invention to/from facsimile apparatus 20. An operator can remove scanner 1 from facsimile apparatus by pulling scanner 1 with hands on concavity section 13. And the operator can attach removed scanner 1 to facsimile apparatus 20 easily. In other words, the operator pushes scanner 1 to facsimile apparatus 20 with the scanning surface up. At this time, engaging hole 11 and engaging groove 12 of scanner 1 is engaged with the engaging section (not shown) of facsimile apparatus 20.

When scanner 1 is installed in facsimile, power lug (not shown) provided on the surface faced toward facsimile apparatus of scanner 1 is placed touching with power supply plate 3003 of facsimile apparatus 20, thereby power is supplied to scanner 1. A battery (not shown) built in scanner 1 is charged by thus power supply. In addition, while power is supplied to scanner 1, image data stored in memory 21 is transferred from the infrared port (not shown) provided on the back of scanner 1 to infrared receiving section 32 provided in facsimile apparatus 20. In addition, as described above, in this embodiment, the transfer of image data is performed with scanner 1 installed in facsimile apparatus 20. However, the present invention is not limited to the embodiment, and it is possible to transfer image data with scanner 1 removed from facsimile apparatus 20.

Next the operation of the scanner in the embodiment of the present invention configured described above is explained. After the operator removed scanner 1 from facsimile apparatus, put scanner 1 on original 2 to be scanned, and confirmed a position to be scanned, he/she slides scanner 1 on the original pushing scanning button 3 illustrated in FIG. 1. Original 2 is scanned by the image sensor (not shown) through the optical system of scanning unit (not shown). At this time, by counting the number of rotations of a slit hole (not shown) combined with the encoder roller (not shown), a moving amount of the original is detected. The scanned image data are stored in memory 21 built in scanner 1. Since scanner 1 in this embodiment is a cordless type, the operator can perform the scanning operation in any space not depending on the position of facsimile apparatus with no interruption by a cord.

Next the operation for changing the image mode is explained with reference to FIG. 6.

FIG. 6 is a flow chart of the operation when changing the image mode of scanner 1 in the embodiment of the present invention. First it is decided whether or not erasing button 5 is pushed (step ST1). In the case where erasing button 5 is pushed, it is decided whether or not image data are stored in memory section 21 (step ST2).

Next when it is decided that image data are stored in memory section 21, the image data in memory section 21 are erased (step ST3) and it is notified that the image data have been erased, by turning off memory indicating section 6 (step ST4).

On the other hand, in the case where it is decided that image data are not stored in memory section 21 in step ST2, further it is decided whether or not the image mode is a photograph mode of scanner 1 (step ST5). When the decided result indicates the image mode is the photograph mode, the image mode of scanner 1 is changed to a character mode (step ST6) and image mode indicating section 7 is turned off (step ST7). When the image mode is not the photograph mode in step ST5, the image mode of scanner 1 is changed to the photograph mode (step ST8) and image mode indicating section 7 is turned on (step ST9).

Thus, in the case where erasing button 5 is pushed when image data are not stored in memory section 21, the image mode of a scanning device is changed not working to erase image data.

Accordingly, it is not necessary to provide in scanner a button to change the image mode separately. And when image data are scanned by a wrong image mode, it is possible to scan new image data after erasing the image data by operating erasing button 5 and changing the image mode of the scanning device.

In addition, since memory indicating section 6 that is a indicating section indicates not only where or not image data are in memory section 21 but also whether or not image mode can be changed, a user can decide whether or not the image data are in memory section 21 and whether or not the image mode can be changed instantly, thus improving the maneuverability.

According to the present invention, it is obvious as described above that it is possible to change the image mode by scanner 1 without installing scanner 1 in facsimile apparatus 20 on purpose and to prevent the image data stored in a memory section to be erased by accident. Further it is possible to prevent the image data to be scanned by the wrong image mode and to change the image mode of scanner 1 without increasing the number of operation buttons newly besides the erasing button.

What is claimed is:

1. A scanner which is attachable to and detachable from a facsimile apparatus, said scanner comprising:
    a mechanism to be attached to and detached from said facsimile apparatus;
    a pick up device which picks up an image of an original;
    a memory which stores the picked up image;
    an interface which transfers the picked up image stored in said memory to said facsimile apparatus which transmits the image;
    an erasing button which erases the image from said memory while said scanner is one of detached from and attached to the facsimile apparatus
    a controller adapted to detect whether an image is present in said memory upon depression of said erasing button and, when said controller detects that there is no image in said memory, to switch between a first mode and a second mode, said first mode obtaining an image of the original composed of a first type of data, and said second mode obtaining an image of the original composed of a second type of data.

2. The scanner according to claim 1, wherein said scanner receives power supplied from said facsimile apparatus with said scanner installed in said facsimile apparatus.

3. The scanner according to claim 1, wherein said scanner transfers the picked up image to said facsimile apparatus with said scanner installed in said facsimile apparatus.

4. The scanner according to claim 1, wherein said first type of data corresponds to a photographic image, and said second type of data corresponds to a character image.

5. The scanner according to claim 1, wherein said controller is adapted to erase an image from said memory, when said controller detects that the image is present in said memory.

6. The scanner according to claim 1, said scanner having a mode changing function, wherein said mode changing function changes said mode between said first mode and said second mode, when said erasing button is operated and when image data are not stored in said memory.

7. The scanner according to claim 1, said scanner further comprising;
    an indicator that indicates whether or not image data are stored in said memory; and
    a mode controller that changes the image mode of said scanner, when said erasing button is pushed and when said indicator indicates that image data stored in said memory has been erased.

8. The scanner according to claim 1, said scanner further comprising:
    a detector which detects whether or not said scanner is detached from said facsimile apparatus; and
    a controller which renders the erasing button operable when said detector detects that said scanner is detached from said facsimile apparatus.

9. A scanner which is attachable to and detachable from a facsimile apparatus, said scanner comprising:
    a pick up device which picks up an image of an original;
    a memory which stores the picked up image;
    an interface which transfers the image stored in said memory to the facsimile apparatus, the facsimile apparatus configured to transmit the image; and
    a mode changing button which has at least an erasing function and a mode changing function; wherein:
    said erasing function erases the image from said memory; and
    said mode changing function changes a mode between a first mode and a second mode, said first mode obtaining an image of the original composed of a first type of data, and said second mode obtaining an image of the original composed of a second type of data.

10. The scanner according to claim 9, wherein said first type of data corresponds to a photographic image, and said second type of data corresponds to a character image.

11. The scanner according to claim 9, wherein said mode changing function changes said mode between said first mode and said second mode when said mode changing button is operated and when image data are not stored in said memory.

12. The scanner according to claim 9, said scanner further comprising;
    an indicator that indicates whether or not image data are stored in said memory; and
    a mode controller that changes the mode of said scanner, when said mode changing button is pushed and when said indicator indicates that image data stored in said memory has been erased.

13. The scanner according to claim 9, said scanner further comprising:
    a detector which detects whether or not said scanner is detached from said facsimile apparatus; and
    a controller which renders the mode changing button operable when said detector detects that said scanner is detached from said facsimile apparatus.

14. A facsimile apparatus comprising;
    a communicator for transmitting and receiving image data via public lines;
    a recorder for recording said image data received;
    a paper feeder for feeding recording paper to said recorder;
    a scanner, said scanner including a pick up device for scanning image data of an original, a memory for storing the scanned image data, an interface section for transferring said scanned image data to said facsimile apparatus, an erasing button for erasing the image data stored in said memory when said scanner is one of detached from and attached to the facsimile apparatus, and a controller adapted to detect whether image data is present in said memory upon depressing of said erasing button;
    said controller being configured to switch, when said controller detects that there is no image data in said memory, between a first mode and a second mode, said first mode obtaining an image of the original composed of a first type of data, and said second mode obtaining an image of the original composed of a second type of data.

15. A facsimile apparatus according to claim 14, wherein said scanner is installed in said a facsimile apparatus with an original scanning surface facing up.

16. A facsimile apparatus according to claim 14, wherein said accommodating section has a closed face at one and an opening at another end, sail closed face having an infrared receiver, and said scanner having an infrared emitting device located at a position facing said infrared receiver.

17. The facsimile apparatus according to claim 14, wherein said first type of data corresponds to a photographic image, and said second type of data corresponds to a character image.

18. The facsimile apparatus according to claim 14, wherein said controller is adapted to erase an image from said memory, when said controller detects that the image is present in said memory.

19. A mode switching method of a scanner which is attachable to and detachable from a facsimile apparatus, the method comprising:

detecting, by a control section, pushing of a mode changing button provided on a scanner;

erasing image data, when image data are stored in a memory, when said mode changing button is pushed; and changing a mode between a first mode and a second mode, when image data are not stored in a memory, said first mode obtaining an image of the original composed of a first type of data, and said second mode obtaining an image of the original composed of a second type of data.

20. The method according to claim 19, wherein said first type of data corresponds to a photographic image, and said second type of data corresponds to a character image.

* * * * *

UNITED STATES PATENT AND TRADEMARK OFFICE
CERTIFICATE OF CORRECTION

PATENT NO. : 6,104,508
DATED : August 15, 2000
INVENTOR(S) : H. MIYAZAKI It is certified that error appears in the above-identified patent and that said Letters Patent is hereby corrected as shown below:

At column 9, line 3 (claim 16, line 3) of the printed patent, "sail" should be ---said---.

Signed and Sealed this

Fifteenth Day of May, 2001

*Attest:*

NICHOLAS P. GODICI

*Attesting Officer*     Acting Director of the United States Patent and Trademark Office